(12) United States Patent
Suryanarayana et al.

(10) Patent No.: US 11,775,648 B2
(45) Date of Patent: Oct. 3, 2023

(54) CONTAINERIZED METADATA WITH UEFI FIRMWARE FILE SYSTEM

(71) Applicant: Dell Products L.P., Round Rock, TX (US)

(72) Inventors: Shekar Babu Suryanarayana, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 181 days.

(21) Appl. No.: 17/350,331

(22) Filed: Jun. 17, 2021

(65) Prior Publication Data

US 2022/0405390 A1  Dec. 22, 2022

(51) Int. Cl.
*G06F 21/57* (2013.01)
*G06F 16/14* (2019.01)
*G06F 9/4401* (2018.01)

(52) U.S. Cl.
CPC .......... *G06F 21/572* (2013.01); *G06F 9/4403* (2013.01); *G06F 16/14* (2019.01)

(58) Field of Classification Search
CPC ....... G06F 21/572; G06F 9/4403; G06F 16/14
See application file for complete search history.

(56) References Cited

U.S. PATENT DOCUMENTS

2015/0033065 A1\* 1/2015 Canepa ............... G06F 11/1008 714/6.11

\* cited by examiner

*Primary Examiner* — Gary Collins
(74) *Attorney, Agent, or Firm* — Jackson Walker L.L.P.

(57) ABSTRACT

An information handling system may include a plurality of information handling resources comprising firmware elements; at least one processor; and a computer-readable medium having instructions thereon that are executable by the at least one processor for: storing metadata associated with data that is stored in the plurality of firmware elements of the information handling system; and implementing a single filesystem configured to allow unified access to the data via the metadata.

18 Claims, 4 Drawing Sheets

CONTAINERIZED METADATA WITH UEFI FIRMWARE FILE SYSTEM

TECHNICAL FIELD

The present disclosure relates in general to information handling systems, and more particularly to accessing firmware information in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, there are various difficulties in accessing firmware in an information handling system. Any component of a particular hardware platform may have its own firmware, which may store operational variables, data structures, or in general any information. For example, such firmware may take the form of serial peripheral interface (SPI) memory, embedded controller (EC) memory, platform non-volatile memory (NVRAM), firmware disposed on add-in cards, etc. in various embodiments. For purposes of this disclosure, the terms "firmware" or "NVRAM" may both be used generically and interchangeably (unless the context indicates otherwise) to refer to any of such embodiments.

Currently, the data stored in firmware space is not "modular" in the sense that there is no unified way of determining the starting and ending addresses for a given element of data. It would be desirable to provide a unified filesystem that is able to access such platform firmware information in a modular fashion. It would further be desirable to provide access to such information from a booted operating system, as well as to provide containerized access and access from a pre-boot environment such as a Unified Extensible Firmware Interface (UEFI) Basic Input/Output System (BIOS) environment.

It is to be noted that various terms discussed herein are described in the UEFI Specification Version 2.8, released March 2019 (hereinafter, UEFI Specification), which is hereby incorporated by reference in its entirety. One of ordinary skill in the art with the benefit of this disclosure will understand its applicability to other specifications (e.g., prior or successor versions of the UEFI Specification). Further, some embodiments may be applicable to different technologies other than UEFI. In particular, some embodiments may apply to the various phases of the UEFI boot process, such as security (SEC), pre-EFI initialization (PEI), driver execution environment (DXE), boot device selection (BDS), runtime (RT), etc.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with accessing firmware in information handling systems may be reduced or eliminated.

In accordance with embodiments of the present disclosure, an information handling system may include a plurality of information handling resources comprising firmware elements; at least one processor; and a computer-readable medium having instructions thereon that are executable by the at least one processor for: storing metadata associated with data that is stored in the plurality of firmware elements of the information handling system; and implementing a single filesystem configured to allow unified access to the data via the metadata.

In accordance with these and other embodiments of the present disclosure, a method may include an information handling system that includes a plurality of information handling resources comprising firmware elements storing metadata associated with data that is stored in the plurality of firmware elements; and the information handling system implementing a single filesystem configured to allow unified access to the data via the metadata.

In accordance with these and other embodiments of the present disclosure, an article of manufacture may include a non-transitory, computer-readable medium having computer-executable code thereon that is executable by a processor of an information handling system for: storing metadata associated with data that is stored in a plurality of firmware elements of the information handling system; and implementing a single filesystem configured to allow unified access to the data via the metadata.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
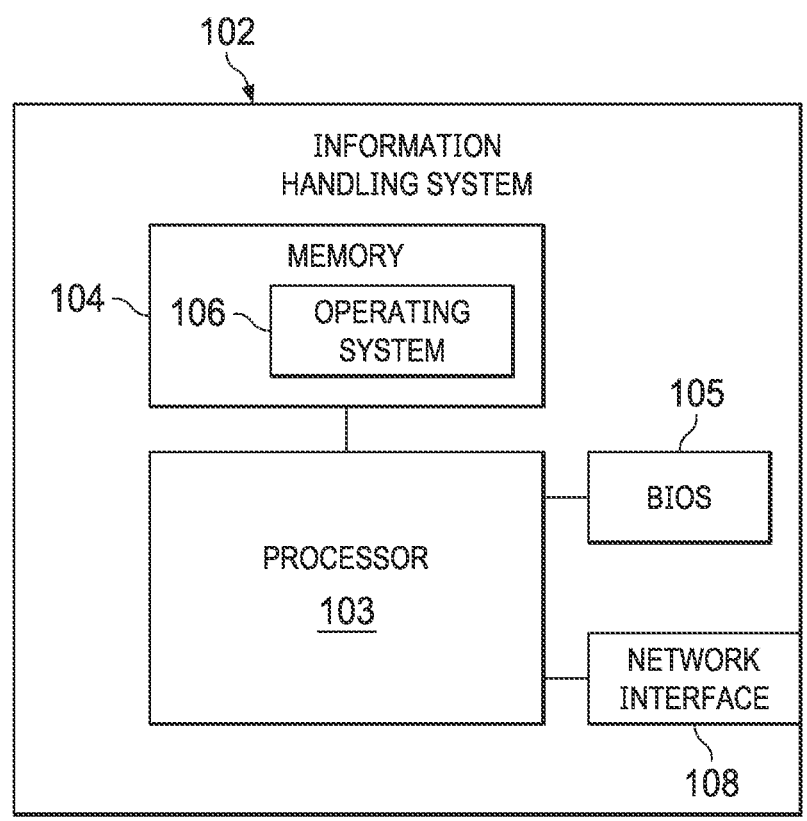
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

In general, any information handling resource of information handling system 102 may include a firmware. For the sake of concreteness, this disclosure will discuss in detail the example of UEFI firmware, but one of ordinary skill in the art with the benefit of this disclosure will understand its applicability to other device firmware as well.

As discussed above, it would be desirable to have a filesystem driver that provides unified access to the disparate firmware elements within information handling system 102. Various embodiments of this disclosure may provide such functionality in different contexts. For example, some embodiments may be applicable in the context of "traditional" systems (e.g., non-virtualized, non-containerized systems). Other embodiments may be applicable in "modern" systems (e.g., virtualized and/or containerized systems such as Docker, Kubernetes, containerd, etc.), which may use a virtual machine manager (VMM) such as a hypervisor. Yet other embodiments may provide such functionality from any of the various stages of a pre-boot environment.

Some embodiments may thus provide for a virtualized non-volatile filesystem, which may implement multi-stage pre-boot failsafe data access methods. Containerized metadata for seamless non-volatile address space access may also be provided for a plurality of disparate firmware elements.

In particular, metadata describing the data that is stored in firmware elements may be used to create a map of the available data, allowing it to be accessed in a modular fashion. In some embodiments, soft pointers may be used to access desired locations without requiring knowledge of their physical hardware addresses. In this way, a flat memory map of firmware space may be created, allowing access via a standard filesystem interface.

In some embodiments, Docker-defined, secure, namespace-based containers for trusted firmware data may provide access both at the OS and container level, as well as in any of various pre-boot phases. This may enhance security as well. For example, if a firmware data store is compromised with malicious code, it may be prevented from consuming a large amount of resources and thereby disrupting service or performing malicious activities.

In these and other embodiments, container-mapped dynamic namespaces may be used for files and/or variable-size extensions to efficiently manage the firmware space. Cloud containers can extend the firmware file data in some embodiments to recreate the firmware data over the cloud, which may aid in dynamic restoration of platform firmware data in the event of failure.

Figure 2:
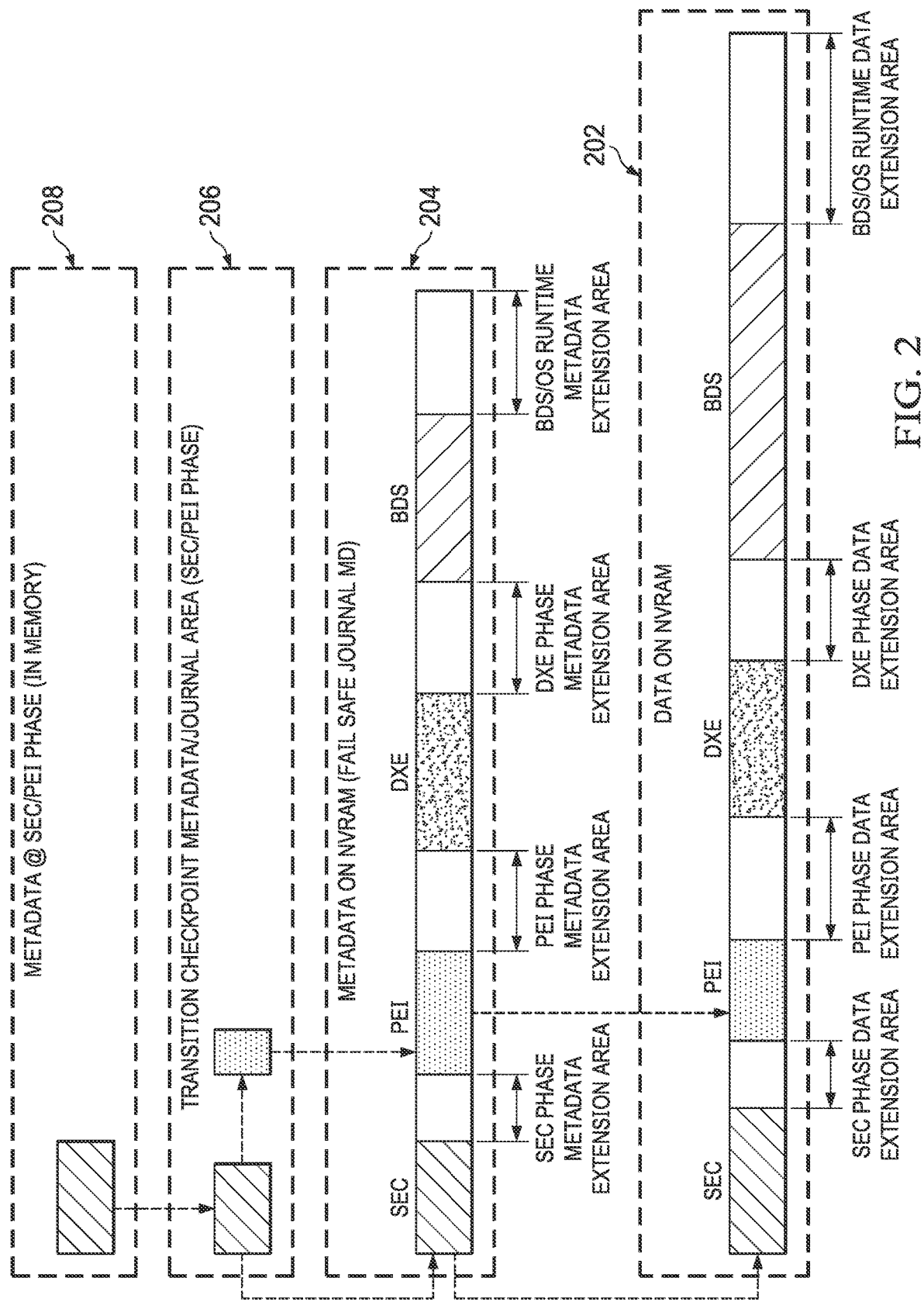
FIGS. 2-4 illustrate block diagrams of example filesystem architectures, in accordance with embodiments of the present disclosure.

Turning now to FIG. 2, a block diagram is shown of a virtualized non-volatile filesystem with failsafe data access for the SEC/PEI pre-boot stages. In particular, FIG. 2 illustrates a virtual abstraction with a transition checkpoint to provide access to a metadata-driven data access method on NVRAM.

Data 202 resides on the NVRAM itself. Various different data regions are shown, including regions for the different stages of UEFI boot (e.g., SEC, PEI, DXE, and BDS). Each of these regions also includes an extension area on the NVRAM, allowing for expansion of the data stored in that region.

As shown in FIG. 2, the extension areas may be adjacent to their respective regions. However, in other embodiments, the extension areas may be disposed elsewhere in the NVRAM's physical address space. An indexing table may provide a layer of indirection allowing for the data and extension areas to reside in any desired portions of the NVRAM. Further, in some embodiments, the extension areas may be stored in other physical storage resources or even in the cloud.

In-memory metadata 208 illustrates how metadata may be exposed to a pre-boot environment, an OS, or a container. The arrows depicted in FIG. 2 illustrate a request to read and/or write data and/or the metadata that corresponds to data 202 on the NVRAM. For example, a particular blob of in-memory metadata 208 may correspond to one or more elements of failsafe journal metadata in journal area 206. The elements of journal area 206 may reference elements of metadata 204, which may finally reference the data 202 itself in NVRAM. Metadata 204 and journal area 206 may also reside on the NVRAM in some embodiments. The journal area 206 may be used provide for fault-resiliency in some embodiments.

A transition checkpoint refers generally to the transition between the pre-boot environment and the OS, allowing access from the OS into the pre-boot filesystem. In some embodiments, the transition checkpoint may provide multi-threaded access to the firmware filesystem, allowing for multiple simultaneous accesses. The transition checkpoint may be implemented to allow for offset-mapped direct access to the NVRAM data store in some embodiments.

In general, some embodiments may allow for access from one pre-boot phase to the data of a different pre-boot phase. For example, code running in the DXE phase may access SEC data and vice versa, etc.

Figure 3:
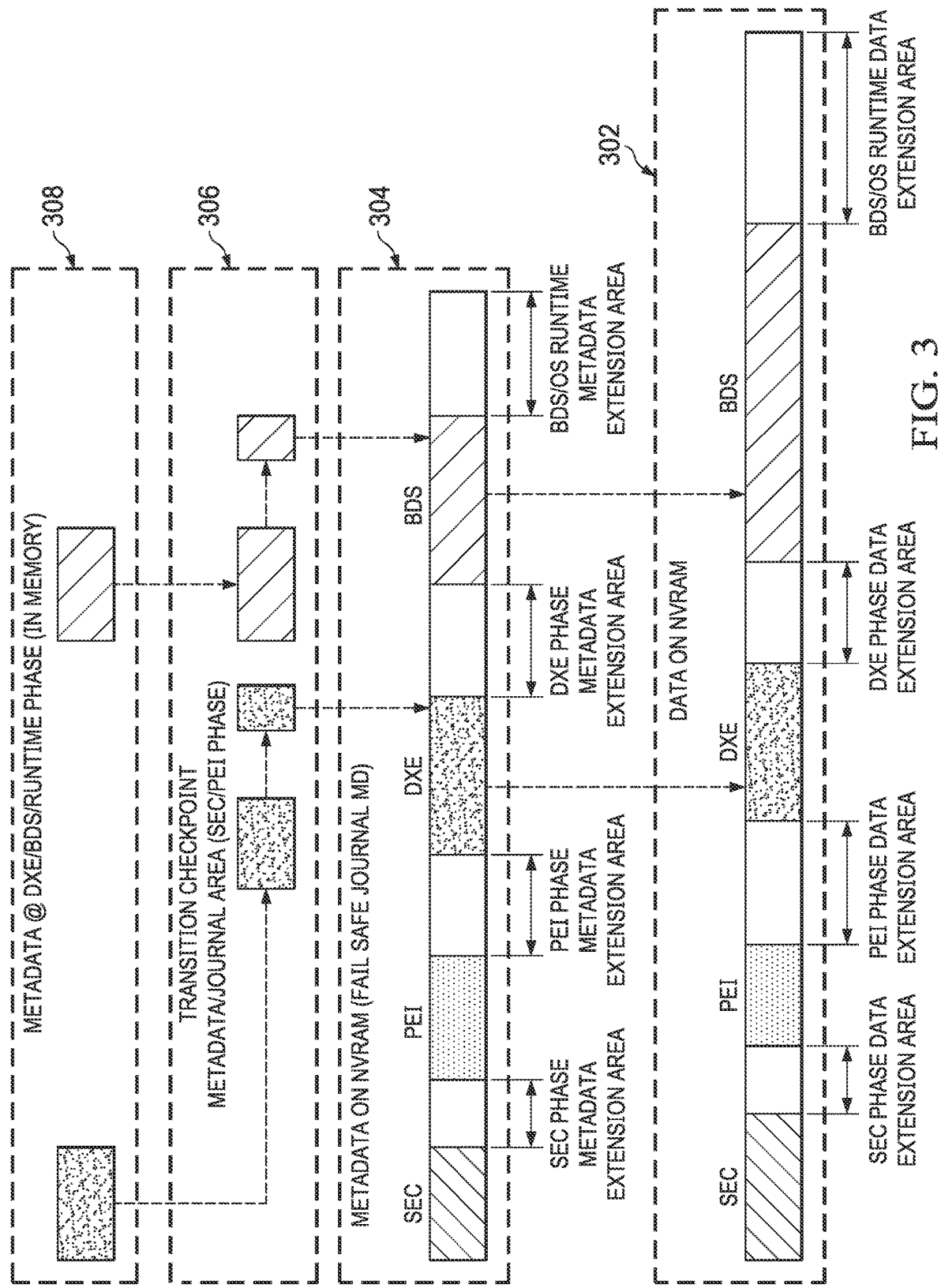

Turning now to FIG. 3, a similar block diagram is shown in which access is provided to later boot stages (e.g., DXE, BDS, and OS runtime). For the sake of brevity, only the differences relative to FIG. 2 will be discussed in detail.

As shown in FIG. 3, two memory regions are exposed via in-memory metadata 308 to allow access to the NVRAM filesystem via a memory map. In this embodiment, a DXE protocol may be published as a transition checkpoint with journal data indicating where in memory the metadata is located. This may be dynamically calculated to determine the free and occupied data areas in NVRAM. The boot phase-wise metadata may be indexed through a multi-stage checkpoint to determine the journal index to get the actual metadata corresponding to the file or variable to be accessed.

In some embodiments, multiple writes may be handled via a direct key index from a journal area to get the metadata of a free area within the boot phase mapped NVRAM. This may reduce the NVRAM access time, as well as providing filesystem access with reduced requirements for NVRAM reclaims, as the space may be dynamically mapped to the metadata index by the journal area.

Snapshots may be taken in some embodiments (e.g., at selected times such as at every boot or upon resuming from standby) and stored in the journal area, allowing for the metadata to be updated as the underlying data changes.

Figure 4:
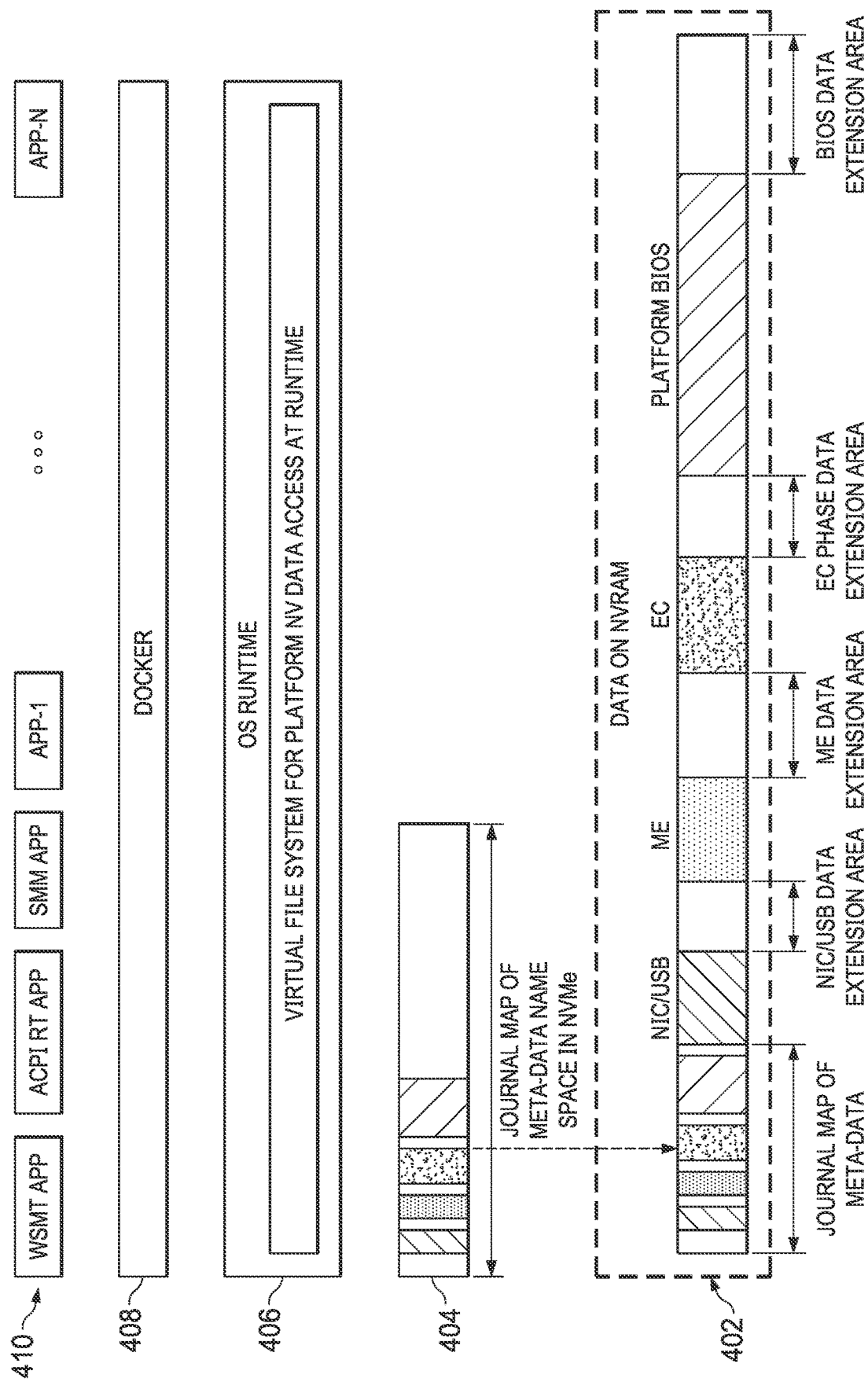

Turning now to FIG. 4, a block diagram is shown in which access is provided in a containerized system. In particular, a journal map 404 of the metadata may be stored in NVRAM and exposed via a virtual filesystem runtime at the OS level. Containerized apps 410 running via a hypervisor 408 such as Docker may access the NVRAM data via the metadata exposed by the virtual filesystem.

The virtual filesystem may tunnel securely into metadata using hash values (e.g., based on GUIDs). Once the actual metadata is read, the journal may be generated to recover to a staged failsafe version of recent data. Similarly, the transition checkpoint metadata is usable from any boot stage. The journaling may be used as a cache of the data, providing faster access. If any failure is detected, then the journal contents may be obtained, and staged recent write transactions may be merged to fully recover the recent data in the NVRAM store.

In some embodiments, an NVRAM recovery may be performed automatically. For example, the staged writes in the journal area may be looked up, and an NVRAM reclaim module may be installed on the journal metadata. Then the main/spare/working store on NVRAM may be erased, and the most recent and context-specific data may be restored over the NVRAM store.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a plurality of information handling resources comprising firmware elements, wherein at least one of the firmware elements is a Unified Extensible Firmware Interface (UEFI) Basic Input/Output System (BIOS) firmware, and wherein another one of the firmware elements is a device firmware for an information handling resource;
   at least one processor; and
   a computer-readable medium having instructions thereon that are executable by the at least one processor for:
   storing metadata associated with data that is stored in the plurality of firmware elements of the information handling system; and
   implementing a single filesystem configured to allow unified access to the data via the metadata.

2. The information handling system of claim 1, wherein the single filesystem is accessible via a pre-boot environment of the information handling system.

3. The information handling system of claim 2, wherein the pre-boot environment is a UEFI BIOS pre-boot environment.

4. The information handling system of claim 3, wherein data associated via a first UEFI phase is accessible via a second UEFI phase.

5. The information handling system of claim 1, wherein the metadata is stored in at least one of the firmware elements.

6. The information handling system of claim 1, wherein the single filesystem further includes a journal area configured to provide failsafe write access to the plurality of firmware elements.

7. A method comprising:
   an information handling system that includes a plurality of information handling resources comprising firmware elements storing metadata associated with data that is stored in the plurality of firmware elements, wherein at least one of the firmware elements is a Unified Extensible Firmware Interface (UEFI) Basic Input/Output System (BIOS) firmware, and wherein another one of the firmware elements is a device firmware for an information handling resource; and
   the information handling system implementing a single filesystem configured to allow unified access to the data via the metadata.

8. The method of claim 7, wherein the single filesystem is accessible via a pre-boot environment of the information handling system.

9. The method of claim 8, wherein the pre-boot environment is a UEFI BIOS pre-boot environment.

10. The method of claim 9, wherein data associated via a first UEFI phase is accessible via a second UEFI phase.

11. The method of claim 7, wherein the metadata is stored in at least one of the firmware elements.

12. The method of claim 7, wherein the single filesystem further includes a journal area configured to provide failsafe write access to the plurality of firmware elements.

13. An article of manufacture comprising a non-transitory, computer-readable medium having computer-executable code thereon that is executable by a processor of an information handling system for:
   storing metadata associated with data that is stored in a plurality of firmware elements of the information handling system, wherein at least one of the firmware elements is a Unified Extensible Firmware Interface (UEFI) Basic Input/Output System (BIOS) firmware, and wherein another one of the firmware elements is a device firmware for an information handling resource; and
   implementing a single filesystem configured to allow unified access to the data via the metadata.

14. The article of claim 13, wherein the single filesystem is accessible via a pre-boot environment of the information handling system.

15. The article of claim 14, wherein the pre-boot environment is a UEFI BIOS pre-boot environment.

16. The article of claim 15, wherein data associated via a first UEFI phase is accessible via a second UEFI phase.

17. The article of claim 13, wherein the metadata is stored in at least one of the firmware elements.

18. The article of claim 13, wherein the single filesystem further includes a journal area configured to provide failsafe write access to the plurality of firmware elements.

\* \* \* \* \*